United States Patent [19]
Allen et al.

[11] Patent Number: 5,994,841
[45] Date of Patent: Nov. 30, 1999

[54] CIRCUIT FOR BIASING DISPLAY DEVICE BY COMPENSATING FOR A VARYING LEAKAGE CURRENT

[75] Inventors: Michael W. Allen, Shortsville; Paul DeLucia, Baldwinsville, both of N.Y.

[73] Assignee: Welch Allyn, Inc., Skaneateles Falls, N.Y.

[21] Appl. No.: 08/953,522

[22] Filed: Oct. 17, 1997

Related U.S. Application Data

[63] Continuation-in-part of application No. 08/738,302, Oct. 25, 1996, abandoned.

[51] Int. Cl.$^6$ ...................................................... H04N 5/68
[52] U.S. Cl. .............................. 315/1; 315/383; 324/404; 348/379
[58] Field of Search ................................ 315/1, 381, 383; 348/189, 379, 380; 324/404

[56] References Cited

U.S. PATENT DOCUMENTS

| | | | |
|---|---|---|---|
| 4,224,640 | 9/1980 | Hovens et al. | 348/379 |
| 4,922,328 | 5/1990 | Engel et al. | 348/180 |

*Primary Examiner*—Robert Pascal
*Assistant Examiner*—Justin P. Bettendorf
*Attorney, Agent, or Firm*—Wall Marjama Bilinski & Burr

[57] ABSTRACT

A circuit apparatus and method is disclosed for determining the actual beam current of a display device having at least one cathode and that actual beam current is used to both correctly bias a voltage that drives the display device and determine the actual drive voltage according to a desired beam current. At periodic intervals, according to the invention, a series of test voltages in known relation to one another are applied to the display device, and measured cathode currents corresponding to the applied voltages are stored in appropriate memory elements of an correction unit. If at least two of the test voltages is selected to result in a black level, and at least one of the test voltages is selected to result in a white level beam current then the correction unit can precisely determine actual beam current through application of a mathematical relationship between test voltage an measured beam current which takes into account a leakage current between a cathode and a first grid of the display device.

29 Claims, 4 Drawing Sheets

CIRCUIT FOR BIASING DISPLAY DEVICE BY COMPENSATING FOR A VARYING LEAKAGE CURRENT

CROSS-REFERENCE TO RELATED APPLICATIONS

This application is a continuation-in-part of application Ser. No. 08/738,302 filed Oct. 25, 1996 now abandoned.

BACKGROUND OF THE INVENTION

This invention relates to display devices in general, and in particular to an apparatus and method for biasing a drive voltage in a display device having at least one cathode.

A problem in driving cathode ray tube display devices is that the black level, or cutoff voltage, of such devices varies significantly between two or more devices even in case where the displays are made according to identical manufacturing specifications. Moreover, the cutoff voltage of an individual display device is known to "drift" over the lifetime of a device as a result of aging, and during operation of the device as a result of temperature fluctuations, humidity and other factors.

Given any image presentation, the contrast of the image is defined by the equation:

$$C = \frac{(MAX - MIN)}{(MAX + MIN)} \times 100\%$$

Where C is the contrast percentage

MAX is the maximum brightness in the image

MIN is the minimum brightness in the image

The only way that contrast can reach 100% is if the numerator and denominator are equal, which can only happen if MIN is zero. In a display device, as long as MIN can approach zero, a full range of contrast can be generated, regardless of the value of the MAX. Thus, a minimal black level that does not drift extends the contrast of a display device.

Many cathode ray tube display devices have a mechanical adjustment component, normally a potentiometer, for biasing the device's drive voltage in accordance with the particular cutoff voltage of the device. Normally, the bias of the drive voltage is adjusted once when the device is first manufactured, and is generally not adjusted thereafter. Therefore, the responsiveness of such manually controlled devices to applied drive voltages changes over the lifetime of the device and during the course of operation with drifting cutoff voltage.

A method known as Automatic Kinescope Bias (AKB) has been developed to adaptively bias a display device in accordance with detected changes in cutoff voltage. In the technique of Automatic Kinescope Bias, two test voltages are successively applied to the cathode or grid of a cathode ray tube. The first test voltage is selected to result in a zero, black level beam current, while the second voltage in known relation to the first test voltage, is selected to result in a predetermined white level voltage. The measured cathode current resulting from application of the first voltage is compared to the measured cathode current resulting from application of the second voltage to determine an estimation of actual beam current A biasing voltage for biasing test and drive voltages is adjusted accordingly. AKB successfully corrects all fixed cathode leakage currents, including cathode circuit to grid circuit, further referred to herein as DC leakage.

While AKB techniques greatly improve the responsiveness and contrast control of cathode ray display tubes, they do not adequately characterize all components of leakage current which is influenced by the relative positioning of components of a display device whose positioning changes over time as the device encounters thermal and mechanical stresses. Because known AKB circuits do not take into account all components of current leakage, display tubes having only AKB biasing are commonly observed to erroneously generate a beam current with a drive voltage biased to generate a black screen, or conversely to erroneously generate a black screen when biased to generate a white level beam current.

For applications requiring precise control over electron beam intensity in a cathode ray tube, including for example ophthalmic diagnostic, video medical diagnostic, and telemedicine applications, there is an urgent need for a drive voltage biasing circuit which overcomes the limitations inherent in prior art biasing methods.

SUMMARY OF THE INVENTION

According to its major aspects and broadly stated, the present invention is a circuit apparatus and associated method that correctly biases a drive voltage, and determines the drive voltage according to desired actual beam current, of a cathode display device by accurately compensating for the effects of current leakage and accordingly determining the actual beam current.

An important feature of the invention is that, unlike prior art circuits, the drive voltage biasing circuit and drive voltage determination circuit take into account all components of the cathode circuit to grid circuit (cathode to grid) leakage current. The inventors found that a stimulus induced leakage current component of the cathode to grid leakage constitutes a substantial portion of total leakage current. Because of this leakage current, a discrepancy exists between measured cathode current and the amount of current that actually flows into the cathode (actual beam current). The inventors found that actual beam current could be determined precisely by accounting accurately for all the sources of leakage current including the stimulus induced leakage current.

The circuit apparatus includes a test signal generating unit for generating test voltages, a correction unit for generating bias voltages, and a circuit for determining drive voltage as a function of the actual beam current. The test voltages and bias voltages are presented to a summer at the input of the circuit apparatus, and the summer output is presented to a cathode or grid of a display device.

In the present invention at least three test voltages in known relationship to one another are successively applied to the circuit apparatus. After each test voltage is applied to the display device (at either the grid or the cathode) the apparent cathode current resulting from application of the test voltage is stored by a storage device of the correction unit. Thus, after a test voltage application cycle, an array of measured values for apparent, or measured, current are stored. The error generating circuit determines actual cathode current from these measured values and from the values of the applied test voltage based on a mathematical relationship derived by accurate characterization of leakage current. In doing so, the inventors found that the grid to cathode leakage current varies as the grid to cathode voltage is changed for making the different test voltages. The varying component of the grid to cathode leakage current may be referred to as the grid to cathode AC leakage current, and the stimulus induced leakage current.

The mathematical relationship utilized by the error generating circuit takes into account cathode to grid stimulus induced leakage current, a component of leakage current ignored by prior art biasing circuits. Thereby, the error generating circuit of the present invention is able to determine actual cathode, or beam current more accurately than was possible with application of prior art biasing methods.

When the actual beam current is determined, the correction unit compares actual beam current to a reference current and generates an error voltage that varies in polarity and intensity depending on the difference between the reference current and actual beam current.

These and other features and advantages of the present invention will become clear from a reading of Detailed Description of the Preferred Embodiments in connection with the referenced drawings.

BRIEF DESCRIPTION OF THE DRAWINGS

In the drawings like numerals are used to indicate the same elements throughout the views.

DETAILED DESCRIPTION OF THE PREFERRED EMBODIMENTS

Figure 1:
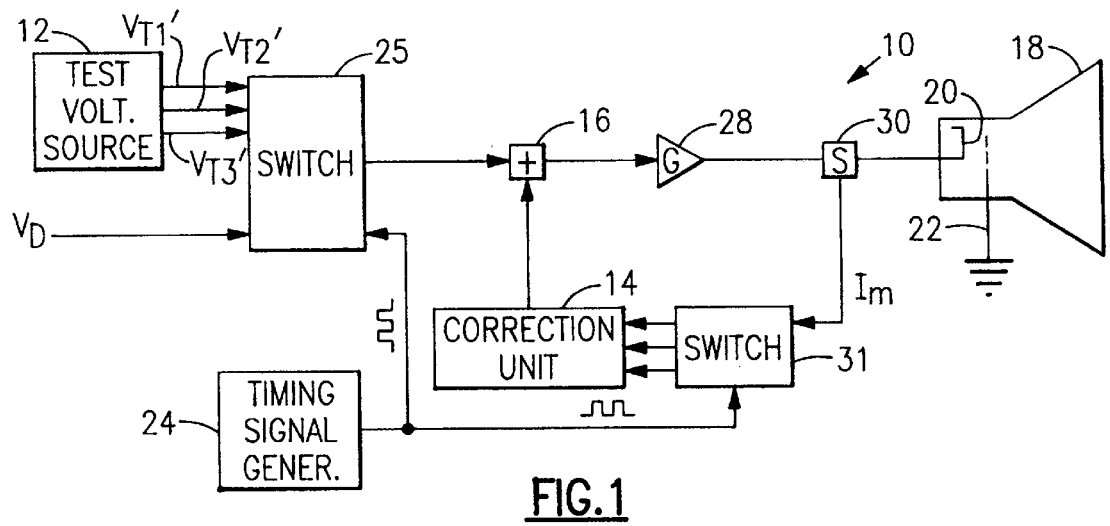
FIG. 1 is a block diagram of a cathode driven drive voltage biasing circuit according to the invention.
Figure 2:
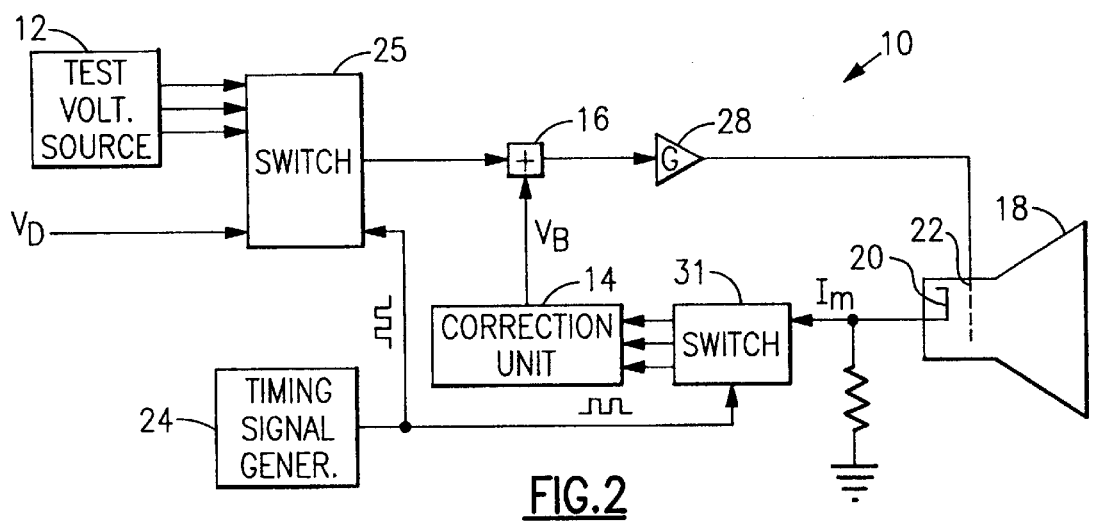
FIG. 2 is a block diagram of a grid driven biasing circuit according to the invention.

A block diagram of one embodiment of the invention is shown in FIG. 1. Circuit apparatus 10 includes a test signal generating unit 12 for generating test voltages, and a correction unit 14 for generating error voltages. The test voltages and error voltages are presented to a summer 16. Summer 16, in turn, generates a tube input voltage which is presented to a display tube 18 either at cathode 20 as shown in FIG. 1 or first grid 22 as shown in FIG. 2. In the circuit of FIG. 1, tube input voltage, $V_i$ is shown as being input into cathode 20 of tube 18. If tube 18 is a color cathode ray tube (CRT); then tube 18 in general has three cathodes; one each for the red, green and blue color spectrums. For intensity level stabilization of a color CRT, then a biasing circuit as described herein should be provided for each of the three cathodes.

Operation of circuit 10 is coordinated by timing signal generator 24 which controls the scanning of tube 18. Circuit 10 can be configured so that during a raster scan, timing signal generator 12 generates appropriate timing signals for input into switch 25, typically provided by an analog multiplexer, so that drive voltages, $V_D$, successively appear at the output of switch 25. At summer 16, each drive voltage, $V_D$, is combined with an error or bias voltage, $V_B$, which has normally been previously generated by correction unit 14 in response to the application of previously applied test voltages. The output of summer 16, may be amplified by amplifier 28 before being input to tube 18.

During a raster scan drive, voltages are presented to tube 18 until a complete rasterized image is formed. However, in accordance with the invention, the voltage presented to tube 18 is periodically made to be a series of test voltages supplied by test voltage generating unit 12. In a test voltage mode, test voltages are applied to summer 16 and in response to application of such test voltages, correction unit 14 processes a new value for bias voltage, $V_B$. Circuit 10 can be adapted to selectively apply test voltages to summer 16 by configuring switch 25 to latch on test voltages received from test signal generator 12 in response to appropriate timing signals received from timing signal generator 24.

Circuit 10 is adapted to commence a test voltage mode of operation on a periodic basis. In a typical embodiment, circuit 10 is adapted to enter a test voltage mode, or cycle, once after each raster scan so that the bias voltage $V_B$ is periodically updated. It is important that circuit 10 updates bias voltage $V_B$ on a periodic basis, e.g. once after each raster scan, or once after a predetermined number of raster scans, given that the responsiveness (as typically indicated by the input voltage required to generate a white level of predetermined intensity) "drifts" over the course of time that the circuit is powered as a result of factors such as heat and humidity level changes.

In the present invention, at least three test voltages, $V_{T1}'$, $V_{T2}'$, $V_{T3}'$, in known relationship to one another, are successively applied to summer 16 when circuit 10 is in a test voltage mode of operation. After each test voltage is biased according to the present value of $V_B$ and applied to the display device (at either the grid or the cathode) the apparent, or measured, cathode current resulting from application of the biased test voltage is sensed by a current sensor 30, and input into correction unit 14 by switch 31 in response to an appropriate timing signal and the current measurement is stored in an appropriate memory device of the correction unit. It is seen from FIG. 2 that cathode current can be sensed directly in the case of a grid driven display device and stored by a storage device of correction unit 14. Thus, after application of a sequence of test voltages, an array of measured values for apparent or measured cathode current $I_M$ are stored. Correction unit 14 determines a value for actual cathode current or beam current $I_K$ from these measured values and in certain embodiments from the values of the applied test voltage based on a mathematical relationship derived by an accurate characterization of leakage current. From measured current data, and possibly from test voltage data, error generating circuit 14 generates an error voltage $V_E$ based on the actual cathode current. So that the bias voltage $V_B$ is not erroneously affected by changing $I_M$ values during a test voltage cycle, the response time of circuit components of correction unit 14 controlling the generation of output $V_B$ is selected to be slower than the clock rate of timing signal generator 24 controlling the rate of data input into correction unit 14. Alternatively, timing signal generator 24 can be adapted to generate a timing signal for input into a holding device so that $V_B$ remains at a previous value until a test voltage application cycle is complete.

While FIGS. 1 and 2 show two possible circuit configurations for the invention, variations in the specific circuits disclosed herein can be made by adapting circuit configuration well known in existing drive voltage biasing art, namely known Automatic Kinescope Bias art, for use in the present invention. It is known, to cite one example, to apply test voltages of a drive voltage biasing circuit at the grid of a cathode biased display device.

Figure 3:
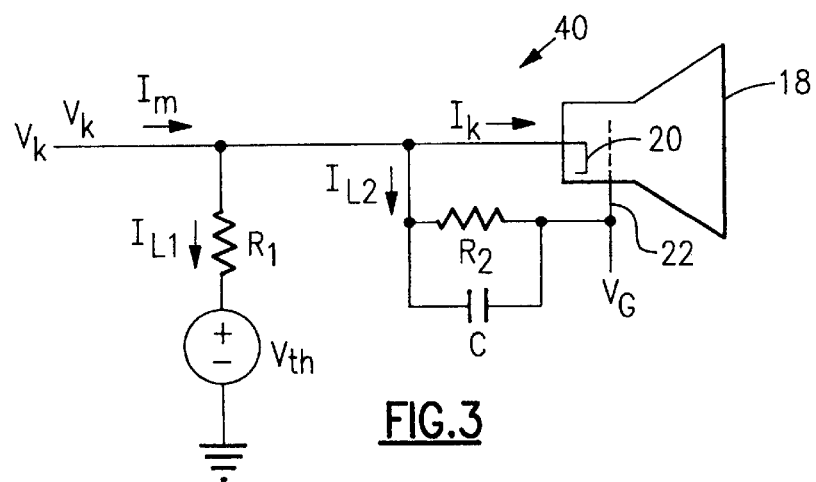
FIG. 3 is an equivalent circuit model of a cathode ray tube, wherein various source of leakage current are modeled.
Figure 4A:
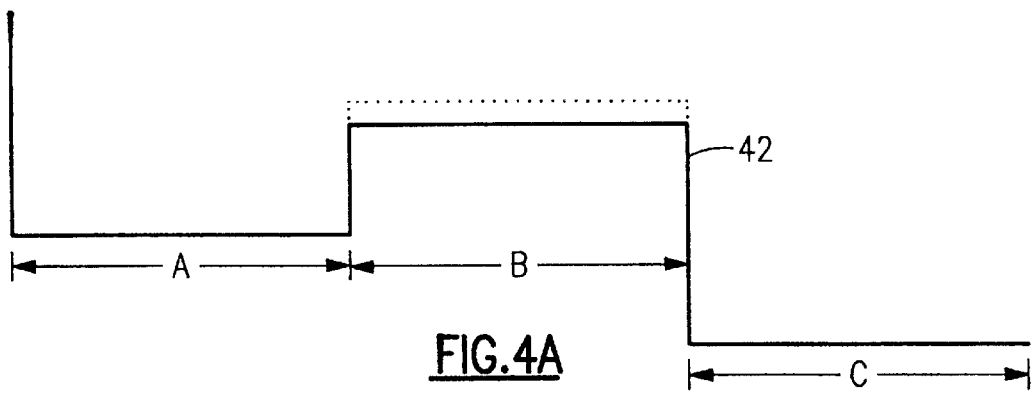
FIG. 4 is a timing diagram showing test voltages, correlated measured cathode current, and preferred sampling pulses.
Figure 4B:
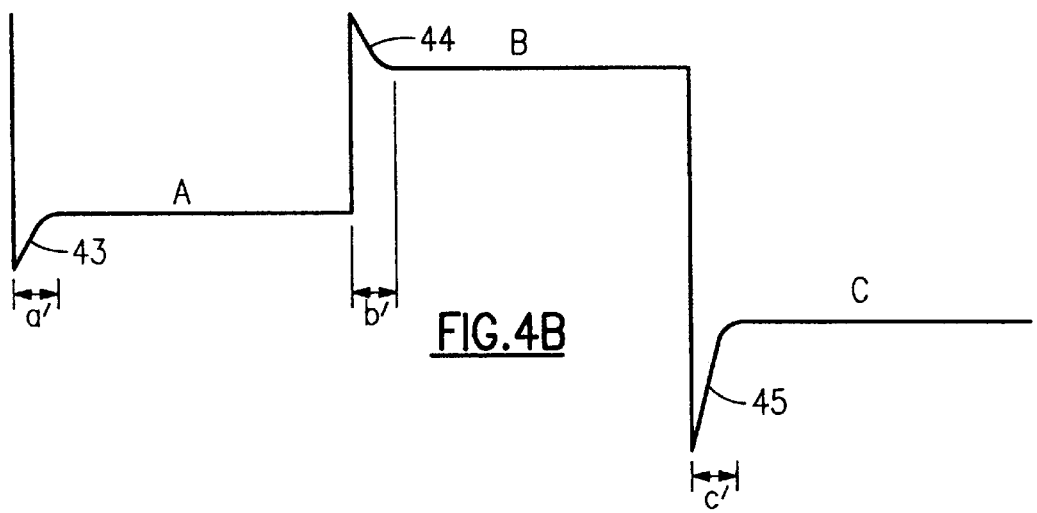
Figure 4C:
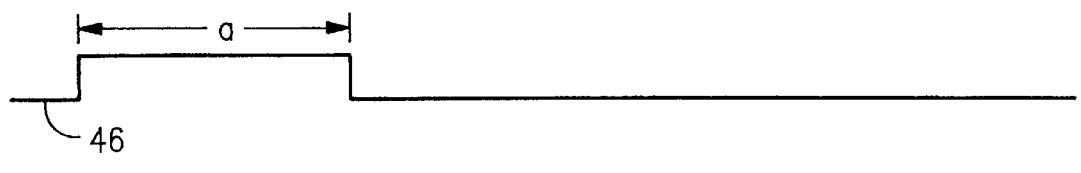
Figure 4D:
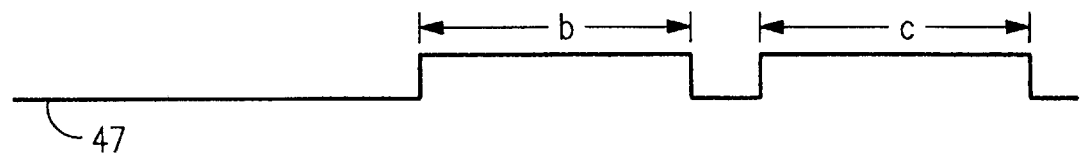

The mathematical relationship utilized by error generating circuit 14 in generating error voltage $V_E$, takes into account all cathode leakage currents. An equivalent circuit model 40 of a cathode ray display tube used in deriving this mathematical relationship is shown in FIG. 3, wherein $I_M$ is the measured cathode current, and $I_K$ is the actual cathode, or beam current. It is seen from equivalent circuit 40 that the measurable quantity $I_M$ is different from actual cathode current $I_K$ as a result of leakage current comprising component leakage currents $I_{L1}$ and $I_{L2}$ flowing through equivalent resistances $R_1$ and $R_2$ respectively.

First leakage current $I_{L1}$ is the leakage current resulting from electron loss from cathode to components associated with tube 18 other than grid 22. Leakage current, $L_{L1}$ can be expressed by the formula $$I_{LI} = \frac{V_K - V_{TH}}{R_1} \quad \text{(EQ. 1)}$$

where $V_{TH}$ and $R_1$ are the thevenin voltage and resistance elements representing the parallel equivalent circuit of all voltage and resistive elements between cathode and all other components of a display device other than grid 22 including the device's heater, video amplifier, and all other drive, amplifier, control and other circuit components.

$I_{L2}$ is the leakage current between the cathode and grid. It can be expressed as:

$$I_{L2} = \frac{V_K - V_G}{R_2} \quad \text{(EQ. 2)}$$

where $V_K$ is the cathode voltage, $V_G$ is the grid voltage, an $R_2$ is an unknown resistance between cathode 20 and grid 22.

By monitoring measured cathode current while successively changing device input voltage and taking measurements, the inventors have discovered that the leakage current $I_{12}$ from the cathode 20 to the grid 22 has a component that varies as the cathode 20 to grid 22 voltage changes, as well as a component that does not vary (the DC leakage). The varying leakage current is caused by a changed voltage across the cathode-grid itself (that may be referred to as the grid to cathode AC leakage current, and the stimulus induced leakage current, and hereinafter referred to as the stimulus induced leakage current). In prior art AKB methods, the leakage current $I_{L1}$ and the non-varying component of leakage current $I_{12}$ are the only leakages considered, and the stimulus induced leakage current is not considered. In the prior art AKB method, a derived value for $I_K$ always differs from actual cathode current by the stimulus induced leakage current. The apparatus and method disclosed herein accounts for the stimulus induced leakage current.

Continuing with reference to equivalent circuit 40 shown in FIG. 3, a derivation of a mathematical relationship utilized by error generating circuit 14 to precisely determine actual cathode current $I_K$ will be described in detail.

Considering the case of a cathode driven CRT, there is a known cutoff voltage $V_C$ above which there is no beam current. That is for $V_K \geq V_C$, then:

$$V_K \geq V_C, I_K = 0 \quad \text{(EQ. 3)}$$

and $$I_M = \frac{V_K - V_{TH}}{R_1} + \frac{V_K - V_G}{R_2} \quad \text{(EQ. 4)}$$

For $V_K < V_C$, then $$I_K = K(V_C - V_K)^\gamma \quad \text{(EQ. 5)}$$

and $$I_M = \frac{V_K - V_{TH}}{R_1} + \frac{V_K - V_G}{R_2} + K(V_C - V_K)^\gamma \quad \text{(EQ. 6)}$$

where $\gamma$ is the non-linear voltage response of the CRT.

In the present invention, a plurality or series of test voltages are applied to tube 18 during a test voltage mode of operation. According to the invention, these voltages are known or in predetermined relation to one another. Also according to the invention, at least two of the test voltages are at levels selected to result in zero beam current, that is at a "black level", and at least one of the voltages is selected to result in a positive actual beam current of a predetermining intensity, that is, a "white level" beam current.

If three test voltages $V_{K1}$, $V_{K2}$, and $V_{K3}$ representing $V_{T1}'$, $V_{T2}''$, and $V_{T3}'$ in the case of the cathode driven CRT (after being biased by the present bias voltage) are applied to cathode 20 in the case of a cathode driven CRT, wherein $V_{K1}$ and $V_{K2}$ are selected to result in a black level (zero) beam current, and $V_{K3}$ is selected to result in a white level beam current of known intensity, then the measured cathode currents $I_{M1}$, $I_{M2}$, $I_{M3}$ corresponding to application of the series of test voltages can be expressed by the equations presented below.

Because $V_{K1}$ and $V_{K2}$ are selected to result in zero actual beam current, then $$I_{M1} = \frac{V_{K1} - V_{TH}}{R_1} + \frac{V_{K1} - V_G}{R_2} \quad \text{(EQ. 7)}$$

and $$I_{M2} = \frac{V_{K2} - V_{TH}}{R_1} + \frac{V_{K2} - V_G}{R_2} \quad \text{(EQ. 8)}$$

while $$I_{M3} = \frac{V_{K3} - V_{TH}}{R_1} + \frac{V_{K3} - V_G}{R_2} + I_K \quad \text{(EQ. 9)}$$

Rewrite EQ. 7 as $$I_{M1} = V_{K1}\left(\frac{R_1 + R_2}{R_1 R_2}\right) - \left(\frac{V_{Th}}{R_1} + \frac{V_G}{R_2}\right) \quad \text{(EQ. 10)}$$

and letting $$\frac{R_1 + R_2}{R_1 R_2} = A \quad \text{(EQ. 11)}$$

and $$\frac{V_{TH}}{R_1} + \frac{V_G}{R_2} = B \quad \text{(EQ. 12)}$$

we have $$I_{M1} = V_{K1}A - B \quad \text{(EQ.13)}$$

$$I_{M2} = V_{K2}A - B \quad \text{(EQ.14)}$$

and $$I_{M3} = V_{K3}A - B + I_K \quad \text{(EQ.15)}$$

If the applied test voltages $V_{K1}$, $V_{K2}$, and $V_{K3}$ are predetermined, or in predetermined relation to one another, it is recognized that equations 13, 14, and 15 constitute a set of three equations having three unknowns, A, B, and $I_K$. It follows then, that the variable $I_K$ corresponding to actual beam current can be solved precisely by application of well known mathematical techniques.

In one embodiment of the invention, correction unit 14 includes a microprocessor which may be configured to read the test voltages $V_{K1}$, $V_{K2}$, $V_{K3}$ and the corresponding measured cathode currents $I_{M1}$, $I_{M2}$, $I_{M3}$; and which is programmed to solve the set of equations 13, 14, and 15. An advantage of including a microprocessor in correction unit 14 is that the microprocessor can easily be programmed, if desired, to generate bias voltages, $V_B$, that vary nonlinearly with $\Delta I$, the difference between determined actual beam current $I_K$ and a reference current $I_{REF}$.

Considering again the set of equations 13, 14 and 15, it is seen that $$I_{M3} = V_{K3}A + (I_{M1} - V_{K1}A) + I_K \qquad (EQ.16)$$

$$I_{M2} = V_{K2}A + (I_{M1} - V_{K1}A) \qquad (EQ.17)$$

and $$I_{M2} - I_{M1} = A(V_{K2} - V_{K1}) \qquad (EQ.18)$$

substituting $$A = \left( \frac{I_{M2} - I_{M1}}{V_{K2} - V_{K1}} \right) \qquad (EQ.19)$$

we have $$I_K = I_{M3} - I_{M1} + (V_{K1} - V_{K3})\left( \frac{I_{M2} - I_{M1}}{V_{K2} V_{K1}} \right) \qquad (EQ.20)$$

Therefore it is recognized that correction unit 14 can be easily adapted to determine a precise value for $I_K$ using well known circuit components selected to carry out the mathematical operations required by EQ. 20.

Selecting test voltages in a predetermined ratio to one another allows for further mathematical simplification. It is seen that if the difference in voltage between $V_{K2}$ and $V_{K3}$ is equal to the difference in voltage between $V_{K1}$ and $V_{K2}$ (that is if $V_{K2}$ is "halfway" between $V_{K1}$ and $V_{K3}$) then $V_{K1} - V_{K2} = V_{K2} - V_{K3}$ for voltages in the range of typical cutoff voltage values. Accordingly, if voltage $V_{K2}$ is selected as a black level voltage halfway between black level voltage $V_{K1}$ and white level voltage $V_{K3}$, we have $$I_K \approx (I_{M3} - I_{M2}) + (I_{M1} - I_{M2}) \qquad (EQ.21)$$

Equations similar to EQ. 21 but having different scaling factors can be constructed by applying test voltages in alternative predetermined ratios (e.g. ⅓, ¼) to one another.

For the case of a grid driven display device, wherein test voltages $V_{G1}$, $V_{G2}$, and $V_{G3}$ representing $V_{T1}'$, $V_{T2}'$ and $V_{T3}'$ in the case of the grid driven display device, are adapted so that $V_{G1}$ and $V_{G2}$ normally result in black level beam current, and $V_{G2}$ is selected to be of a magnitude halfway in magnitude between $V_{G1}$ and $V_{G3}$, we have:

$$I_{M1} = \frac{V_K - V_{TH}}{R_1} + \frac{V_K - V_{G1}}{R_2} \qquad (EQ.22)$$

$$I_{M2} = \frac{V_K - V_{TH}}{R_1} + \frac{V_K - V_{G2}}{R_2} \qquad (EQ.23)$$

and

-continued $$\frac{V_K - V_{TH}}{R_1} + \frac{V_K}{R_2} = A \qquad (EQ.25)$$

Letting $$I_{M3} = \frac{V_K - V_{TH}}{R_1} + \frac{V_K - V_{G3}}{R_2} + I_K \qquad (EQ.24)$$

We have $$I_{M1} = A - \frac{V_{G1}}{R_2} \qquad (EQ.26)$$

$$I_{M2} = A - \frac{V_{G2}}{R_2} \qquad (EQ.27)$$

and $$I_{M3} = A - \frac{V_{G3}}{R_2} + I_K \qquad (EQ.28)$$

Thus $$I_K \approx I_{M3} - I_{M1} - \frac{V_{G1}}{R_2} + \frac{V_{G3}}{R_2} \qquad (EQ.29)$$

Further, by applying $V_{G2}$ at $V_{G2} = \frac{1}{2}(V_{G1} + V_{G3})$, we have $$I_K \approx I_{M3} - I_{M2} - I_{M2} - I_{M1} \qquad (EQ.30)$$

As demonstrated by equations 21 and 30, an approximation for actual beam current can be expressed in mathematical equations requiring for solution a limited number of simple addition and subtraction operations which can be carried out, as is well known to persons skilled in the art to which the invention pertains using an undetermined number of combinations of adding and/or subtracting circuit components which may be comprised, for example of resistive elements, transistors, op-amps, digital logic gates, or similar devices.

Once a determination of actual beam current $I_K$ or a representation thereof is made, $I_K$ (which is often a voltage or byte representation of $I_K$) is compared to a reference current $I_{REF}$ or a representation thereof. By convention, $I_{REF}$ is typically selected to correspond to a 1% white level condition, but may be selected to correspond to any predetermined beam intensity. Correction unit 14 is adapted to generate a bias voltage $V_B$ that varies in magnitude and polarity depending on the difference between $I_K$ and $I_{REF}$, normally using a circuit component that generates a bias voltage proportional to $\Delta I$, the difference between $I_K$ and $I_{REF}$.

Figure 6:
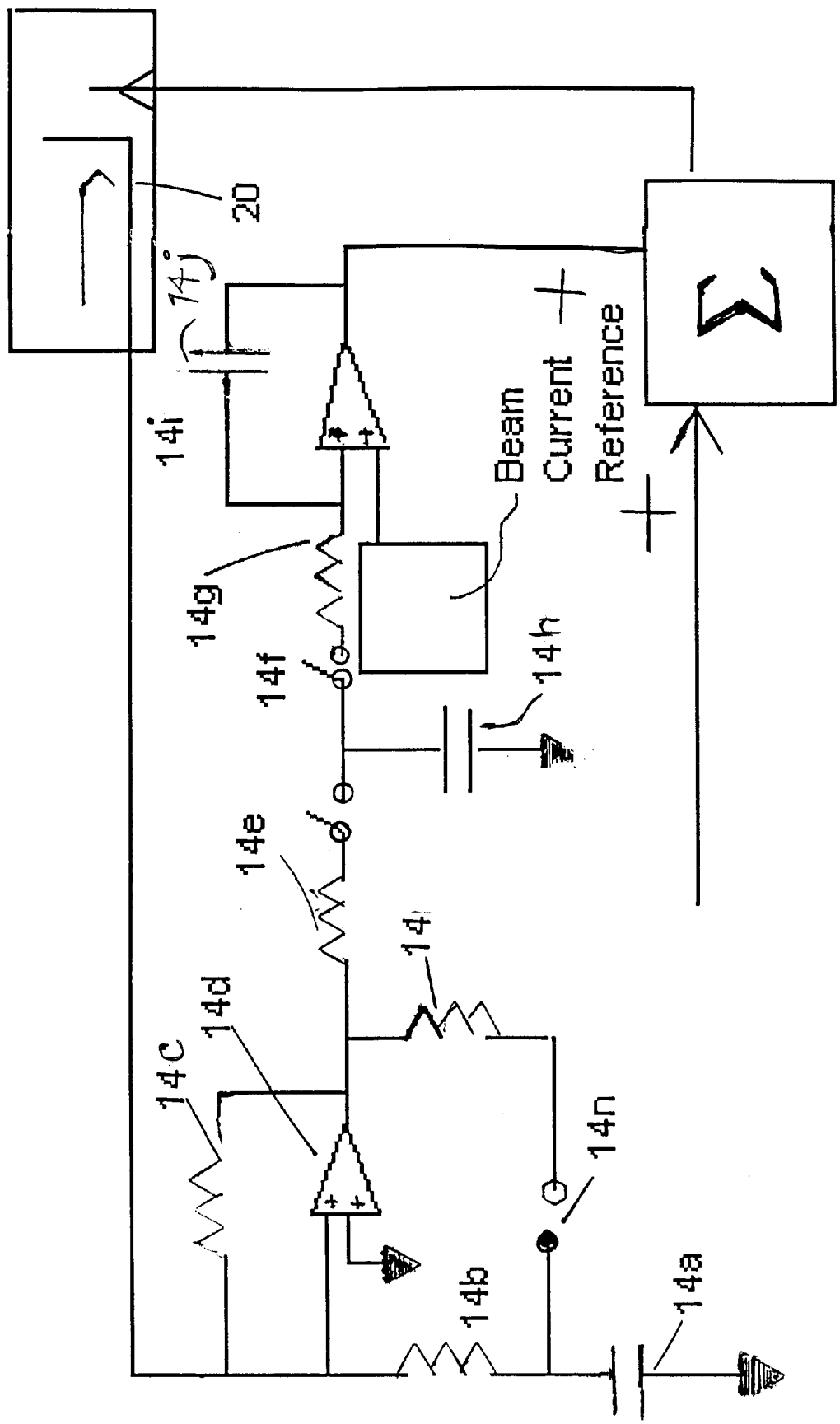
FIG. 6 shows a correction unit circuit embodiment that nulls the DC leakage current from the measurement current before determining the varying leakage current, that includes just three switches and two storage capacitors.

Referring to FIG. 6, a first timing interval commences a measurement of the beam and leakage current. A hold switch 14g and a sample switch 14f are each opened, breaking the current loop, a clamp switch 14n is closed, and the test voltage $V_{G2}$ is applied to first grid 22. The intent is to null off the DC level from the measured current establishing a reference level, $I_{M2}$, from which all subsequent measurements are to be made, not to provide a correction bias during the first timing interval.

The cathode 20 is connected to a transimpedance amplifier formed by operational amplifier 14d and resistor 14c. Because the clamp switch 14n is closed, the sum of leakage current is stored in capacitor 14a. A current flows through a resistor 14m, and into the capacitor 14a, that is proportional to and accordingly representative of the DC error. The resistors 14m and 14c resistance are each less than the resistance of resistor 14b; and the resistance of resistor 14m divided by the switch 14n duty cycle, plus the resistor 14c resistance, is less than the resistor 14b resistance. The DC leakage current error is effectively stripped from the signal and the voltage across capacitor 14a is representative of the measured current during application of $V_{G2}$. The voltage across capacitor 14a thus forms a reference that cancels (or nulls) all DC current leakages.

A second timing interval commences an application of the test voltage $V_{G3}$ scan line, rather than $V_{G2}$. The clamp switch 14n is opened, the sample switch 14f is closed in a manner to be presently disclosed, and the test voltage $V_{G3}$ is applied to the first grid 22. The capacitor 14h is charged through resistor 14e.

In a third timing interval, the switch states are unchanged and the test voltage $V_{G1}$ scan line is applied to first grid 22 rather than $V_{G3}$.

A voltage proportional to the measured current is stored across capacitor 14a. After application of $V_{G1}$, because $V_{G3}$ and $V_{G1}$ are symmetrical about $v_{G2}$ (i.e. equal in magnitude and opposite in polarity with respect to $V_{G2}$), the stimulus induced leakage currents resulting from $V_{G3}$ and $V_{G1}$ respectively are also symmetrical (i.e. equal in magnitude and opposite in polarity with respect to the reference current $I_{M2}$ resulting from $V_{G2}$) and therefore cancel. The remaining voltage across capacitor 14h is representative of the actual beam current during the third timing intervals, i.e $I_K$.

A circuit to determine the stimulus induced leakage current for three non symmetrical test voltages in a known relationship, with at least two in cutoff, may be determined. In cutoff, the ratio of the test voltage change to measured current response change for any test voltage, $\Delta V/\Delta I$, defines $R_2$. Once $R_2$ is known, the stimulus induced leakage current at any test voltage may be conventionally determined by a circuit embodiment of EQ. 29 with the value of $R_2$ replaced by $\Delta V/\Delta I$.

The sample switch 14f is open throughout the first timing interval, and closed during only the last ⅔ of the second timing interval and of the third timing interval. This allows an overshoot of the signals resulting from a capacitive coupling between the first grid 22, and the cathode 20, to settle.

The sample time for each scan line is constant during each timing interval. Therefore, the integration of the voltage to yield a charge is constructively an addition (multiplied by a gain factor). The circuit implementation approximates the mathematical model described by EQs. 1–30.

At the end of the first through third timing intervals, the sample switch 14f is opened and the hold switch 14g is closed. Hold switch 14g remains closed during the duration of the display device scan time. The measured beam current is integrated by a feedback circuit that comprises resistor 14i, operational amplifier 14k, and capacitor 14j, and generating a DC offset to be added to the video signal, thus properly biasing the video signal. Video black matches the cutoff voltage. Initial stabilization may take several frames. Afterwards, any changes induced by drift are controlled.

Referring again to FIG. 3, in addition to there being an equivalent resistive element $R_2$ across the cathode and grid circuits, there is also a stray capacitance element C, as indicated in FIG. 3. As seen in FIG. 4 showing test voltage waveform 42 in a grid-driven circuit, this stray capacitance can effect spikes 43, 44, 45 having durations a', b', c' in measured current $I_M$ as test voltages shown as A, B, C, change from state to state which could conceivably influence calculations of $I_K$ carried out in correction unit 14. With reference to equations 21 and 30, it can be seen that when test voltages $V_{T2}'$, $V_{T3}'$, $V_{T1}'$ are successively applied such that $V_{T1}'>V_{T2}'>V_{T3}'$ or $V_{T1}'<V_{T2}'<V_{T3}'$, wherein according to EQ.21, $V_{T1}'$, $V_{T2}'$, and $V_{T3}'$ are represented by $V_{K1}$, $V_{K2}$, and $V_{K3}$ respectively, and wherein according to EQ.30, $V_{T1}'$, $V_{T2}'$, and $V_{T3}'$ are represented by $V_{G1}$, $V_{G2}$, and $V_{G3}$ respectively, that the effects of interelectrode capacitive coupling are cumulative and that measurement errors resulting from noise currents will be added together. Accordingly, in order to reduce the possibility of a measurement error resulting from stray capacitance, it is preferred that test voltages are applied in an ordering such that initial test voltage $V_{T2}'$ has an amplitude intermediate of $V_{T3}'$ and $V_{T1}'$ as shown in FIG. 4. In this way measurement errors resulting from spikes 43 and 44 tend to cancel each other to reduce the sum measurement error resulting from stray capacitance.

Further to the end that measurement errors resulting from spikes 43, 44, 45 are reduced, it is preferred that timing pulses 46 and 47 generated by timing generator circuit 74 for sampling and holding measured current values are generated so as to optimize the signal to noise ratio for the current waveform. As shown in FIG. 4, the duration of each timing pulse 46 and 47 is made as long as possible while rising at a time, shown as "a," after which current has stabilized, and falling at a time before applications of a next test voltage shown each as "b" and "c".

Figure 5:
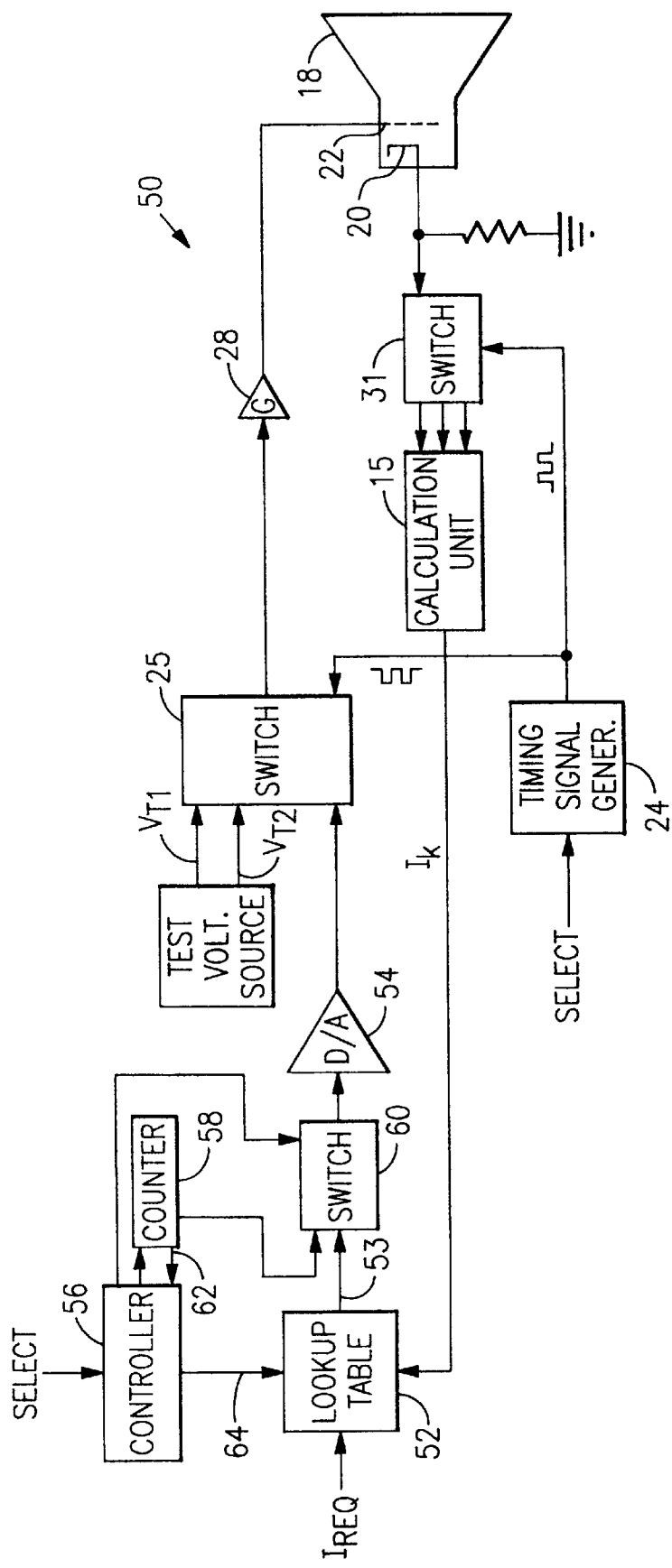
FIG. 5 shows a driving circuit for a display device utilizing a lookup table calibrated so that requested beam intensity is correlated with drive voltage required to bring about the requested beam intensity utilizing a described method for determining actual cathode current.

The methods described herein for determining actual cathode current $I_K$ can be utilized in the making of a CRT drive circuit that is driven by beam intensity requests as shown in FIG. 5.

Referring to FIG. 5, drive circuit 50 contains many of the same components as circuit 10 except that it is not required that correction unit 14 supply a bias voltage to summer 16 unless circuit 50 is configured for optional driving by normal drive voltage $V_D$. Instead correction circuit 14 can be replaced by calculation circuit 15 which generates a single output $I_K$ indicative of determined actual cathode current determined by a calculation method as described herein, after at least two black level voltages and at least one white level test voltage are applied to tube 18.

Circuit 50 includes lookup table 52 wherein beam intensity values are correlated with drive voltage values required to generate the correlated beam intensity values. In operation, requested beam current values, normally in the form of digital data are input into lookup table 52 which generates a drive voltage correlated with that request. The binary drive voltage generated from lookup table 52 is then converted into an analog voltage by D/A converter 54 and is ultimately applied to tube 18. To this point drive circuit 50 is similar in operation to known existing current request driven drive circuits. However, circuit 50 differs substantially from existing current driven drive circuits in terms of the way circuit 50 is calibrated. The lookup table in known current driven drive circuits is calibrated using a feedback loop wherein beam intensity is measured by a light sensor disposed at the exterior of tube 18. By contrast, beam intensity is measured directly by determining actual beam, or cathode current $I_K$ using one of the methods described herein.

With reference now to a specific calibration method which may be used to calibrate circuit 50 it is seen that circuit includes controller 56 which may be for example a state machine or microprocessor, a counter 58 (possibly internal to a microprocessor) and switch 60, normally provided by a digital multiplexer. In response to receiving a SELECT command at controller 56 and timing signal generator 24, circuit 50 commences a calibration mode of operation. In a calibration mode, controller 56 instructs counter 58 to successively generate new calibration voltages, and instructs switch 60 to present counter signals, instead of lookup table drive signals, to D/A converter 54 which converts the calibration voltages.

Meanwhile, in response to a SELECT command, timing signal generator 24 generates timing signals for input to switch 25 so that test signals from test signal source 12 are appropriately applied so as to enable a determination of $I_K$ to be made. Test voltages can also be generated by the lookup table directory. In a calibration mode, two black level voltages from test voltage generator 12 and one white level calibration voltage in known relation to the black level voltages are successively applied to tube 18. In response to the two black level and one white level voltages being received, calculation unit 15 determines $I_K$, the actual beam current resulting from the previous calibration voltage being applied. Calculation unit 15 then transmits a signal indicating $I_K$ to lookup table 52, where the present value of $I_K$ is correlated with the calibration voltage resulting in present cathode current $I_K$. Calibration voltage values can be input into lookup table 52 via data lines 62 and 64 between counter and controller, and between controller and lookup table 52. The calibration process continues until lookup table 52 contains enough correlated current and voltage data to generate drive voltages in response to beam intensity requests. Circuit 50 may be calibrated automatically (e.g once on start up) or whenever a user deems calibration to be necessary.

While the present invention has been explained with reference to a number of specific embodiments, it will be understood that the spirit and scope of the present invention should be determined with reference to the appended claims.

What is claimed is:

1. A circuit apparatus for biasing a drive voltage of a display device having at least one cathode circuit including a cathode and a first grid circuit including a grid, said cathode having a measured cathode current and an actual beam current, said apparatus comprising:
   test voltage generating means for periodically generating a series of test voltages in a predetermined relationship to one another, said cathode having a measured cathode current corresponding to each of said test voltages;
   bias signal generating means responsive to said measured cathode current values for generating a bias voltage after said test voltages are applied; and
   summing means responsive to said test voltage generating means and said bias signal generating means, said summing means generating an input voltage for driving said display device;
   said bias signal generating means generating said bias voltage in accordance with a mathematical relationship dependant on said measured cathode current values, said mathematical relationship derived by taking into account a varying cathode leakage current between said cathode circuit and said first grid circuit, said varying leakage current being a current leakage caused by a changed voltage across said cathode circuit and said first grid circuit.

2. The circuit apparatus of claim 1, wherein said test voltage generating means generates at least three test voltages.

3. The circuit apparatus of claim 1, wherein said test voltage generating means generates at least three test voltages, at least two of said test voltages selected to result in a black level beam current, at least one of said test voltages selected to result in a white level beam current of a predetermined intensity.

4. The circuit apparatus of claim 1, wherein said test voltage generating means generates first, second, and third test voltages, said second test voltage selected to be of a magnitude approximately halfway between said first and second voltages, said first and second voltages selected to result in a black level beam current, said third test voltage selected to generate a white level beam current of a predetermined intensity and wherein said bias signal generating means determines an actual beam current by storing said corresponding measured cathode current values, and by performing addition or subtraction operations on said stored current values.

5. The circuit apparatus of claim 1, wherein said bias signal generating means comprises:
   a storage element storing a reference current;
   means for determining said actual beam current;
   comparing means for comparing said actual beam current to said reference current, said comparing means having an output corresponding to a difference in magnitude and sign between said reference current and said actual beam current; and
   means responsive to said comparing means for generating said bias voltage in accordance with said output.

6. The circuit apparatus of claim 1, wherein said test voltage generating means applies three successive test voltages in a predetermined sequence, $V_i$, $V_{i+1}$, $V_{i+2}$, wherein $V_{i+1}$ is selected to be intermediate in magnitude with respect to $V_i$ and $V_{i+2}$, so that measured cathode current measurement errors resulting from stray capacitance are reduced.

7. The circuit apparatus of claim 1, wherein said bias signal generating means includes a biasing circuit that nulls off a DC leakage level from said measurement current before determining said varying leakage current.

8. The circuit apparatus of claim 1, wherein said bias signal generating means includes at most three switches and at most two storage capacitors.

9. A display device comprising:
   a cathode circuit including a cathode, said cathode having a measured cathode current and an actual beam current;
   a first grid circuit including a grid;
   drive voltage generating means for generating a drive voltage for driving said display device; and
   a circuit apparatus for biasing said drive voltage, said circuit apparatus having:
   test voltage generating means for periodically generating a series of test voltages in a predetermined relationship to one another, said cathode having a measured cathode current corresponding to each of said test voltages;
   error voltage generating means responsive to a measured cathode current for generating an error voltage when said test voltages are applied; and
   summing means responsive to said test voltage generating means and said error generating means, said summing means generating an input voltage for driving said display device;
   said error voltage generating means generating said error voltage in accordance with a mathematical relationship dependant on said measured cathode current values derived by taking into account a varying cathode leakage current between said cathode circuit and said first grid circuit, said varying leakage current being a current leakage caused by a changed voltage across said cathode circuit and said first grid circuit.

10. The display device of claim 9, wherein said test voltage generating means generates at least three test voltages.

11. The display device of claim 9, wherein said test voltage generating means generates at least three test voltages, at least two of said test voltages selected to result in a black level beam current, at least one of said test voltages selected to result in a white level beam current of a predetermined intensity.

12. The display device of claim 9, wherein said test voltage generating means generates first, second, and third test voltages, said second test voltage selected to be at a magnitude approximately halfway between said first and second voltages, said first and second voltages selected to result in a black level beam current, said third test voltage selected to generate a white level beam current of a predetermined intensity, and wherein said error signal generating means determines an actual beam current by storing said corresponding measured cathode current values, and by performing addition or subtraction operations on said stored current values.

13. The display device of claim 9, wherein said error voltage generating means comprises:
   a storage element storing a reference current;
   means for determining said actual beam current;
   comparing means for comparing said actual beam current to said reference current, said comparing means having an output corresponding to a difference in magnitude and sign between said reference current and said actual beam current;
   means responsive to said comparing means for generating said error voltage in accordance with said output.

14. The display device of claim 9, wherein said test voltage generating means applies three successive test voltages in a predetermined sequence, $V_i$, $V_{i+1}$, $V_{i+2}$, wherein $V_i$ is selected to be intermediate in magnitude with respect to $V_i$ and $V_{i+2}$, so that measured cathode current measurement errors resulting from stray capacitance are reduced.

15. The display device of claim 9, wherein said error signal generating means includes a biasing circuit that cancels a DC leakage level from said measured cathode current before determining said varying leakage current.

16. The display device of claim 15, wherein said biasing circuit includes at most three switches and at most two storage capacitors.

17. A method for developing a biasing voltages for biasing a drive voltage of a display device having at least one cathode and a first grid, said method comprising the steps of:
   applying a series of successive test voltages to a summer, at least two of said test voltages selected to result in black level beam current, at least one of said voltage selected to result in a white level beam current, said test voltages having a predetermined relationship to one another;
   storing measured cathode current values that result from said test voltages being applied; and
   determining a value for $I_K$, the actual cathode current flowing into said cathode, by applying a mathematical relationship that is dependant on said measured cathode currents, said mathematical relationship being derived by taking into account a varying cathode leakage current between said cathode circuit and said first grid circuit, said varying leakage current being a current leakage caused by a changed voltage across said cathode circuit and said first grid circuit.

18. The method of claim 17, said method further comprising the step, after said determining step, of:
   comparing said determined value of actual cathode current to a reference current representative of a predetermined white level beam intensity; and
   generating a bias voltage that is dependant on a difference between said actual cathode current value and said reference current.

19. The method of claim 17, wherein said determining step, said actual cathode current is calculated by applying the formula $$I_K = I_{M3} - I_{M1} + (V_{K1} - V_{K3})\left(\frac{I_{M2} - I_{M1}}{V_{K2}V_{K1}}\right)$$

wherein $V_{K1}$ and $V_{K2}$ are applied black level test voltages applied to said cathode, $V_{K3}$ is an applied white level test voltage applied to said cathode, and $I_{M1}$, $I_{M2}$, $I_{M3}$ are measure cathode currents resulting from the test voltages being applied.

20. The method of claim 17, wherein in said determining step, said actual cathode current is calculated by applying the formula $$I_K \approx (I_{M3} - I_{M2}) + (I_{M1} - I_{M2}) \quad (EQ.21)$$

wherein a second black level test voltage is selected in a ratio about halfway in between a first black level test voltage and a white level test voltage, and $I_{M1}$, $I_{M2}$, $I_{M3}$ are measure cathode currents resulting from the test voltages being applied.

21. The method of claim 17, wherein in said determining step, said actual cathode current is calculated by applying the formula $$I_K = I_{M3} - I_{M1} - \frac{V_{G1}}{R_2} + \frac{V_{G3}}{R_2}$$

wherein $V_{G1}$ is an applied black level test voltage applied to said grid, $V_{G3}$ is an applied white level test voltage applied to said cathode, $R_2$ is an equivalent resistance between the cathode and the first grid and defined by the ratio of a said test voltage change to a said measured cathode current change, and $I_{M1}$, $I_{M2}$, $I_{M3}$ are measured cathode currents resulting from the test voltages being applied.

22. The method of claim 17, wherein in said determining step, said actual cathode current is calculated by applying the formula $$I_K \approx I_{M3} - I_{M2} - I_{M2} - I_{M1}$$

wherein a second black level test voltage is selected in a ratio about halfway in between a first black level test voltage and a white level test voltage, and $I_{M1}$, $I_{M2}$, $I_{M3}$ are measured cathode currents resulting from the test voltages being applied.

23. A method for determining actual cathode current flowing into a cathode of a CRT display device having a grid, said method comprising the steps of:
   applying a series of successive test voltages to a summer, at least two of said test voltages selected to result in black level beam current, at least one of said voltage selected to result in a white level beam current, said test voltages having a predetermined relationship to one another;
   storing measured cathode current values that result from said test voltages being applied; and
   determining a value for $I_K$, the actual cathode current flowing into said cathode, by applying a mathematical relationship that is dependant on said measured cathode currents, said mathematical relationship being derived by taking into account a varying cathode leakage current between said cathode circuit and said grid circuit, said varying leakage current being a current leakage caused by a changed voltage across a cathode circuit including said cathode and a grid circuit including said grid.

24. The method of claim 23, wherein said mathematical relationship is further dependant on said applied test voltages.

25. The method of claim 23, further including the step of determining a drive voltage of said CRT display device, said drive voltage determining step including the step of:

determining a value for $I_K$ for each calibration voltage by applying said mathematical relationship; and creating a memory lookup table that correlates each $I_K$ with the corresponding calibration voltage.

26. A circuit apparatus for determining a drive voltage of a display device having at least one cathode and a first grid, said apparatus comprising:

test voltage generating means for generating a series of calibration drive voltages;

actual current measuring means for determining an actual beam current corresponding to each calibration voltage;

lookup table creation means for creating a memory that correlates each actual beam current with the corresponding calibration voltage;

whereby said memory is accessed according to a desired actual beam current value, and a correlated calibration voltage value is retrieved for application as said drive voltage to said cathode, and wherein at least one calibration voltage results in a white level cathode current of a predetermined intensity in which said test voltage generating means includes means for periodically generating said calibration voltage of said predetermined intensity and additionally at least two display device drive voltages that result in a black level cathode current, wherein said periodic drive voltages are in a known relationship to one another, and further including a bias signal generating means responsive to said actual beam current values corresponding to said periodic drive voltages, for generating a bias voltage after said periodic drive voltages are applied in accordance with a mathematical relationship dependent on a plurality of measured cathode current values, said mathematical relationship derived by taking into account a varying cathode leakage current between said cathode circuit and said first grid circuit, said varying leakage current being a leakage current caused by a changed voltage across said cathode circuit and said first grid circuit.

27. The circuit apparatus of claim 26, wherein said test voltage generating means includes means for generating at least two display device drive voltages that result in a black level cathode current.

28. The circuit apparatus of claim 26, wherein said test voltage generating means further includes a means for periodically generating a series of two display device drive voltages that result in a black level cathode current, and at least one display device drive voltage that results in a white level cathode current, said periodically generated drive voltages in a predetermined relationship to one another and each periodically generated drive voltage having a corresponding measured cathode current;

bias signal generating means responsive to said measured current flowing into said cathode that corresponds to each calibration voltage for generating a bias voltage after said periodically generated display drive voltages are applied;

driving means for generating a voltage corresponding to said calibration voltages; and summing means responsive to said calibration voltages and said bias signal generating means, said summing means generating an input voltage for driving said display device.

29. The circuit apparatus of claim 28, wherein said bias signal generating means generates said bias voltage in accordance with a mathematical relationship dependent on a plurality of measured cathode current values derived by taking into account a varying cathode leakage current between said cathode circuit and said first grid circuit, said varying leakage current being a current leakage caused by a changed voltage across said cathode circuit and said first grid circuit.

* * * * *